(12) United States Patent
Uchida et al.

(10) Patent No.: US 6,294,884 B1
(45) Date of Patent: Sep. 25, 2001

(54) VERTICAL DEFLECTION CIRCUIT AND COLOR PICTURE TUBE APPARATUS

(75) Inventors: Yukio Uchida; Tomoaki Iwamoto, both of Osaka (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/290,129

(22) Filed: Apr. 12, 1999

(30) Foreign Application Priority Data

Apr. 21, 1998 (JP) .................................................. 10-110480

(51) Int. Cl.⁷ ........................................................ G09G 1/04
(52) U.S. Cl. ......................................... 315/364; 315/382.1
(58) Field of Search ...................... 315/368.28, 364–380, 315/407, 408, 382.1, 398

(56) References Cited

U.S. PATENT DOCUMENTS

| 3,684,920 | * | 8/1972 | Smith ............................. 315/27 TD |
| 3,706,905 | * | 12/1972 | Alexander ....................... 315/21 CH |
| 3,706,907 | * | 12/1972 | Wolfe .............................. 315/27 GD |
| 3,760,222 | * | 9/1973 | Smith ................................. 315/13 C |
| 4,105,933 | * | 8/1978 | Inoue ................................... 315/387 |
| 4,338,549 | * | 7/1982 | Haferl ................................. 315/393 |
| 5,260,627 | * | 11/1993 | Yokota et al. ....................... 315/400 |
| 5,523,658 | * | 6/1996 | Fukuma et al. ................. 315/368.19 |

FOREIGN PATENT DOCUMENTS 8-102270    4/1996   (JP) .

* cited by examiner

*Primary Examiner*—Don Wong
*Assistant Examiner*—Trinh Vo Dinh
(74) *Attorney, Agent, or Firm*—Merchant & Gould P.C.

(57) ABSTRACT

A vertical deflection circuit for a color picture tube apparatus, which reduces a white horizontal belt-like area that appears near vertical center of a color picture tube screen, caused by the operation of a convergence correction circuit using switching characteristics of a diode. The circuit comprises a vertical deflection yoke and a vertical linearity correction circuit connected to the vertical deflection yoke. The vertical deflection yoke has a vertical deflection coil, a convergence correction circuit using a diode as a switch, and a vertical coma aberration correction coil. An impedance of the vertical linearity correction circuit varies within a range where a vertical deflection current is in the vicinity of 0 A so as to reduce an impedance of the vertical deflection circuit.

8 Claims, 4 Drawing Sheets

VERTICAL DEFLECTION CIRCUIT AND COLOR PICTURE TUBE APPARATUS

BACKGROUND OF THE INVENTION

1. Field of the Invention

The present invention relates to a vertical deflection circuit to be used in a color picture tube apparatus of a television or a display monitor.

2. Description of the Prior Art

In in-line color picture tubes used in televisions and display monitors, when there is a misalignment between the central axis of the vertical deflection magnetic field and the central axis of the color picture tube, or there is a rotational misalignment between the vertical deflection magnetic field and the color picture tube, mis-convergence occurs separately at the upper and lower portions of the color picture tube screen (fluorescent screen).

As means for separately correcting these kinds of mis-convergences at the upper portion and the lower portion of the color picture tube's screen, Publication of Unexamined Japanese Publication No. Hei 8-102270 discloses two auxiliary coils that are provided at a rear portion, i.e. on the electron gun side, of a deflection yoke. Those auxiliary coils are supplied with correction current by a convergence correction circuit that uses a diode bridge circuit.

FIG. 4 shows a conventional vertical deflection yoke circuit, and the curve (a) in FIG. 5 shows the impedance characteristics of this conventional vertical deflection yoke.

As shown in FIG. 4, the vertical deflection yoke comprises vertical deflection coils 60 installed in a color picture tube 70, a convergence correction circuit 2 that uses a diode switch, and vertical coma aberration correction coils 209a, 209b, 209c, 209d, 210a, and 210b. The convergence correction circuit 2 comprises a resistor 201 and a resistor 202, which are connected in series. Connected in parallel thereto is a series circuit including a diode 203, a variable resistor 205, and a diode 204 disposed in the same direction as the diode 203. Further, a series circuit, including a diode 206 which is disposed in the direction reverse to the diode 203, a variable resistor 208 and a diode 207 disposed in the same direction as the diode 206, is connected in parallel to the series circuit including the resistors 201 and 202. The convergence correction circuit 2 is a part of a vertical deflection circuit.

However, if such a convergence correction circuit is added to correct mis-convergence the impedance characteristics of the vertical deflection yoke 3 change abruptly near the center of the vertical deflection period, or in other words, near a deflection current value of 0 A, as shown by curve (a) in the center of FIG. 5. This is due to an impedance change of the convergence correction circuit 2 in response to the voltage-current characteristics of the diodes 203, 204, 206 and 207 in the convergence correction circuit 2. For this reason, the vertical deflection voltage that is supplied to the vertical deflection yoke cannot follow an impedance change of the vertical deflection yoke with respect to the deflection current, and the rate of the vertical deflection decreases near the vertical center of the color picture tube screen. Therefore, the vertical density of scanning lines near the vertical center of the screen increases, causing the problem that a white horizontal belt-like area appears on the screen.

This type of white belt-like area also has appeared with convergence correction circuits other than that explained in this prior art example, for example, in circuits where a correction means using the switching characteristics of a diode were added to the vertical deflection circuit.

SUMMARY OF THE INVENTION

It is an object of the present invention to solve the above-mentioned problem, that is, to provide a vertical deflection circuit for a color picture tube apparatus that can reduce the white horizontal belt-like area appearing near the vertical center of a color picture tube screen, caused by an operation of a convergence correction circuit using switching characteristics of a diode.

A vertical deflection circuit in accordance with the invention comprises a vertical deflection yoke and a vertical linearity correction circuit connected to the vertical deflection yoke. The vertical deflection yoke has a vertical deflection coil, a convergence correction circuit using a diode as a switch, and a vertical coma aberration correction coil. The impedance of the vertical linearity correction circuit varies within a range where the vertical deflection current is in the vicinity of 0 (zero) A so as to reduce the impedance of the vertical deflection circuit.

With this configuration, the abrupt increase in the impedance of the vertical deflection circuit near the vertical center of the color picture tube display can be avoided. Consequently, the white horizontal belt-like area that appears near the vertical center of a color picture tube screen can be reduced to a level where it causes practically no problem.

It is preferable that the vertical linearity correction circuit is connected in parallel to the vertical deflection yoke and comprises a first diode; a second diode connected in parallel to the first diode and disposed in a direction reverse to the first diode a first resistor connected parallel to the first diode and the second diode; and a second resistor connected in series to the first diode and the second diode.

With this configuration, the impedance of the vertical deflection yoke near the vertical center of the color picture tube screen can be reduced with the switching function of the diodes, which operate under both polarities of the vertical deflection voltage. In other words, by adjusting the combined resistances of the first resistor and the second resistor, the impedance of the vertical deflection yoke easily can be adjusted, and the impedance change of the vertical deflection yoke near the vertical center of the color picture tube screen can be decreased.

It is preferable that the first diode and the second diode have substantially the same voltage-current characteristics as the diode in the convergence correction circuit. With this configuration, the diodes of the convergence correction circuit are switched on and off simultaneously with the diodes of the vertical linearity correction circuit. Consequently, the impedance of the vertical deflection yoke near the vertical center of the present color picture tube screen can be effectively decreased.

It is preferable that at least one of the first resistor and the second resistor is a variable resistor. With this configuration, the impedance of the vertical deflection yoke easily can be adjusted to an optimum value by adjusting the resistance of the variable resistor while observing the screen of the color picture tube.

In accordance with the present invention, a color picture tube apparatus having a color picture tube with a built-in inline electron gun, includes a vertical deflection circuit. The circuit comprises a vertical deflection yoke mounted on the color picture tube and a vertical linearity correction circuit connected to the vertical deflection yoke. The vertical deflection yoke has a vertical deflection coil, a convergence correction circuit using a diode as a switch, and a vertical coma aberration correction coil. An impedance of the vertical linearity correction circuit varies within a range where a vertical deflection current is in the vicinity of 0 A so as to reduce the impedance of said vertical deflection circuit.

It is preferable that the vertical linearity correction circuit is connected in parallel to the vertical deflection yoke and comprises a first diode; a second diode connected in parallel to the first diode and disposed in a direction reverse to the first diode; a first resistor connected in parallel to the first diode and the second diode; and a second resistor connected in series to the first diode and the second diode.

Thus, with the present invention, the white horizontal belt-like area that appears near the vertical center of the color picture tube screen can be effectively reduced by suppressing the increase of the impedance of the vertical deflection circuit near the vertical center of the color picture tube screen.

DESCRIPTION OF THE PREFERRED EMBODIMENT

First Embodiment

Figure 1:
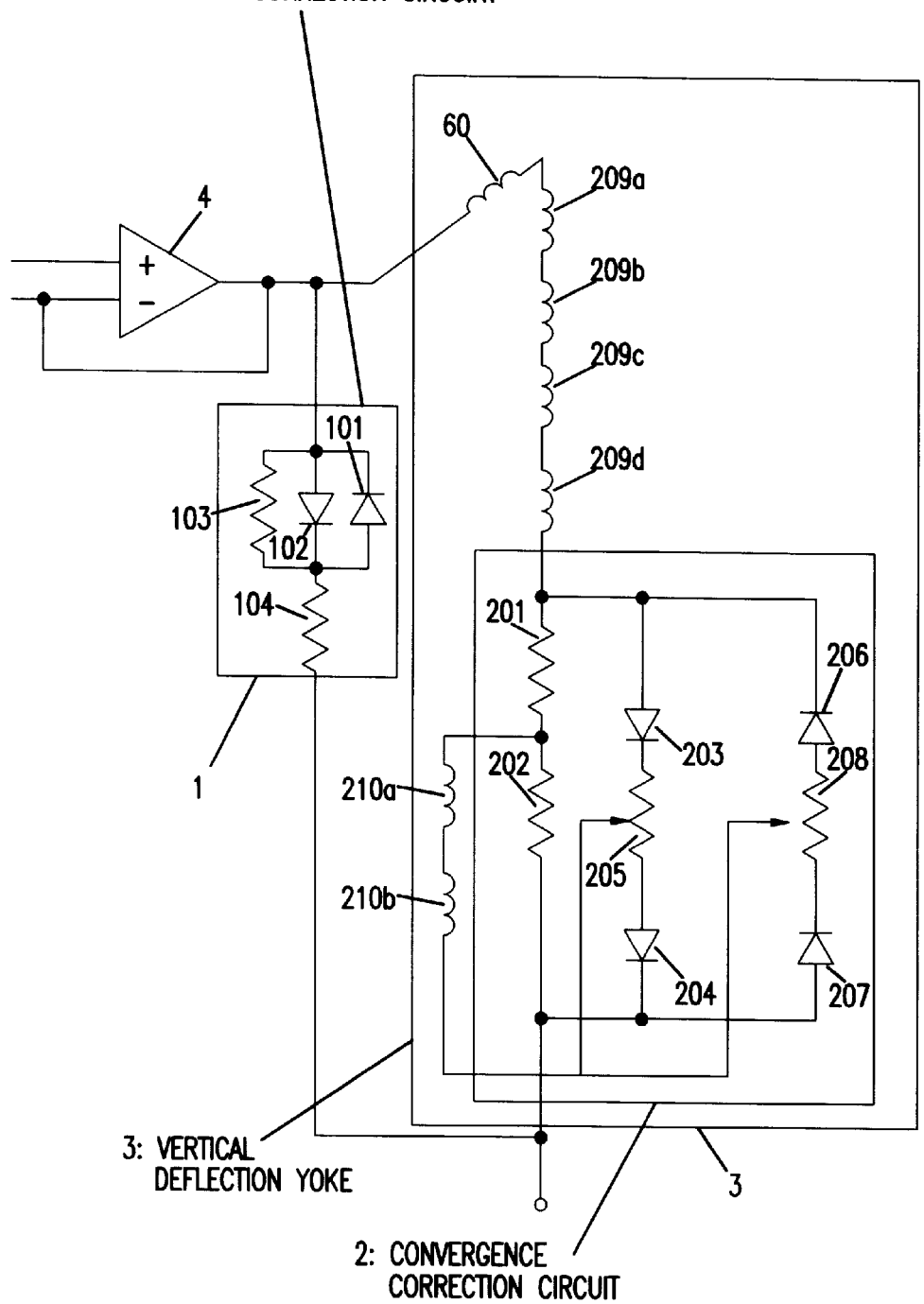
FIG. 1 shows a circuit diagram of a vertical deflection circuit according to the first embodiment of this invention.

As shown in FIG. 1, the vertical deflection circuit of the present invention comprises a vertical deflection yoke 3 and a vertical linearity correction circuit 1. The vertical deflection yoke 3 comprises a vertical deflection coil 60, vertical coma aberration correction coils 209a, 209b, 209c, 209d, correction coils 210a and 210b, and a convergence correction circuit 2. The convergence correction circuit 2 utilizes the switching function of the diodes 203, 204, 206 and 207. As this circuit has the same configuration as the circuit of the prior art shown in FIG. 4, a further explanation is not necessary. The vertical linearity correction circuit 1 is a characteristic feature of the present invention, and is a means for decreasing the impedance of the vertical deflection circuit when the electron beam comes near the vertical center of a color picture tube screen (not shown in the drawings), or in other words, near a vertical deflection current of 0 (zero) A.

Figure 4:
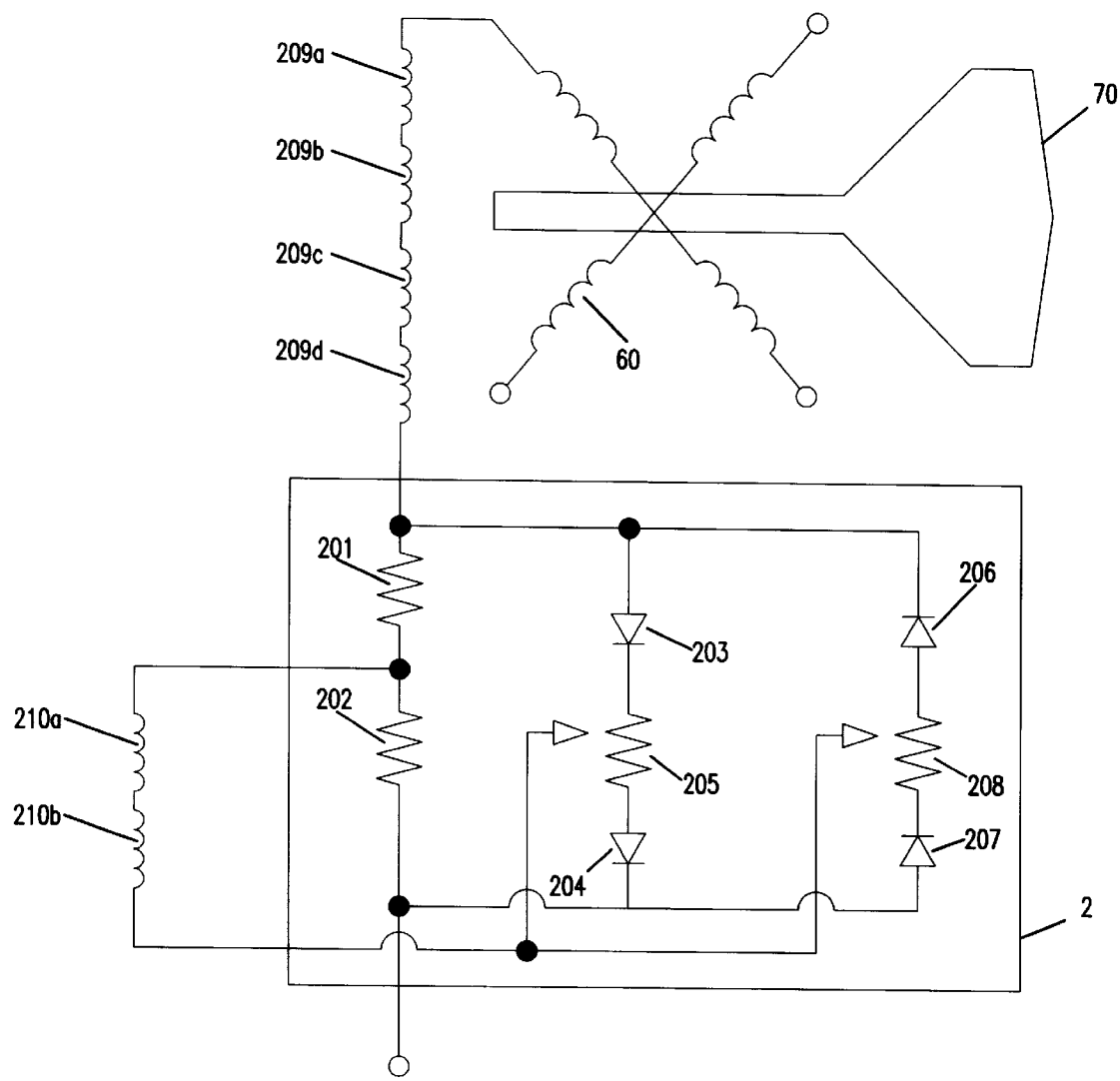
FIG. 4 is a circuit diagram of a conventional vertical correction yoke.

In the configuration of a color picture tube apparatus according to the invention, the vertical deflection yoke 3 of such a vertical deflection circuit is installed in a color picture tube having a built-in inline electron gun in the same manner as that shown in FIG. 4.

The vertical deflection coil 60 is connected to an output terminal of a vertical deflection IC 4, which is a differential amplifier. One terminal of the vertical linearity correction circuit 1 is connected to the output terminal of the vertical deflection IC 4 and the other terminal is connected to an output terminal of the convergence correction circuit 2, so that the vertical linearity correction circuit 1 is connected in parallel to the vertical deflection yoke 3.

The vertical linearity correction circuit 1 comprises a first diode 101 and a second diode 102 that is in parallel to, but is disposed in a direction reverse to, the diode 101. The vertical linearity correction circuit 1 also comprises a first resistor 103, which is connected in parallel to the parallel circuit including the diodes 101 and 102, and a second resistor 104, which is connected in series to the parallel circuit of the diodes 101 and 102.

Figure 2:
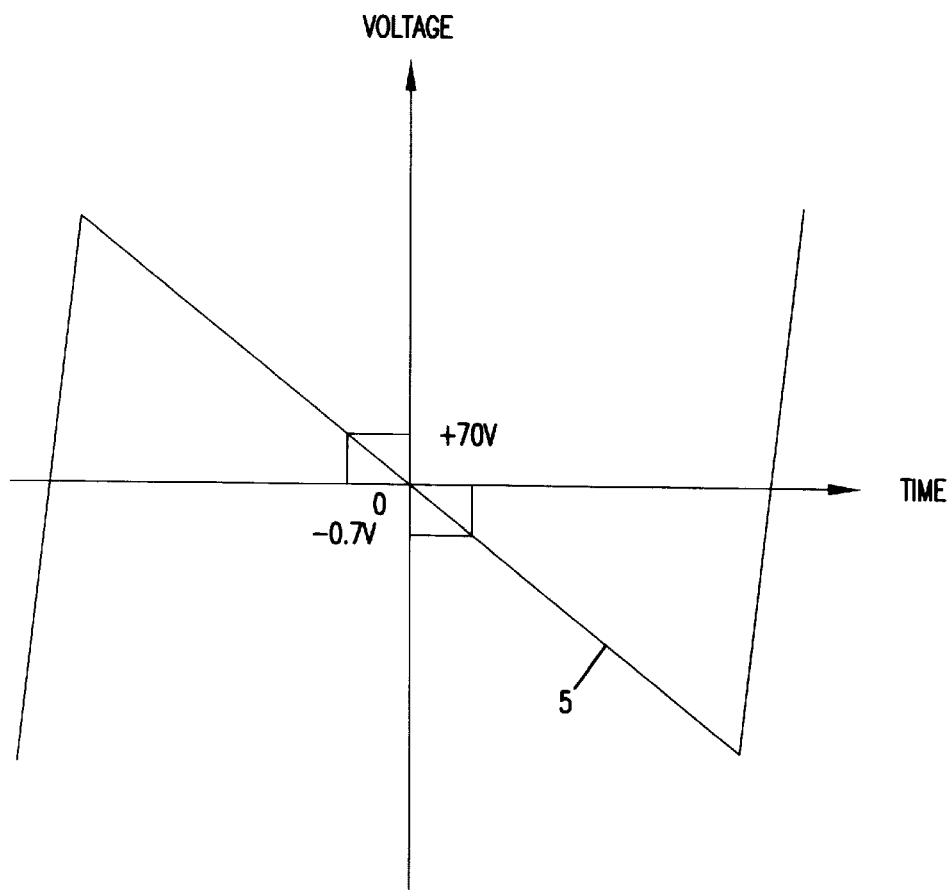
FIG. 2 is a diagram showing a waveform of the vertical deflection voltage.

A detailed explanation of the function of the vertical deflection circuit of the present invention is as follows:

If the vertical deflection voltage 5 shown in FIG. 2 is applied, the resistor 103 is repeatedly turned on and off by switching the diodes 101 and 102. In other words, when the vertical deflection voltage 5 is at least +0.7 V, the diode 101 is on, and when the vertical deflection voltage 5 is below −0.7 V, the diode 102 is on. In these ranges, the resistor 103 is short-circuited and only the resistor 104 is effective. On the other hand, when the vertical deflection voltage 5 ranges from −0.7 V to +0.7 V, the resistors 103 and 104 are both effective, since both diodes 101 and 102 are off.

Therefore, when the resistance of the resistor 103 is R1, the resistance of the resistor 104 is R2, and the vertical deflection voltage 5 is below −0.7 V or above +0.7 V, only the resistance of R2 is connected in parallel to the vertical deflection yoke 3. On the other hand, when the vertical deflection voltage 5 is between −0.7 V and +0.7 V, a composite resistor R=R1+R2 is connected in parallel to the vertical deflection yoke 3.

Figure 5:
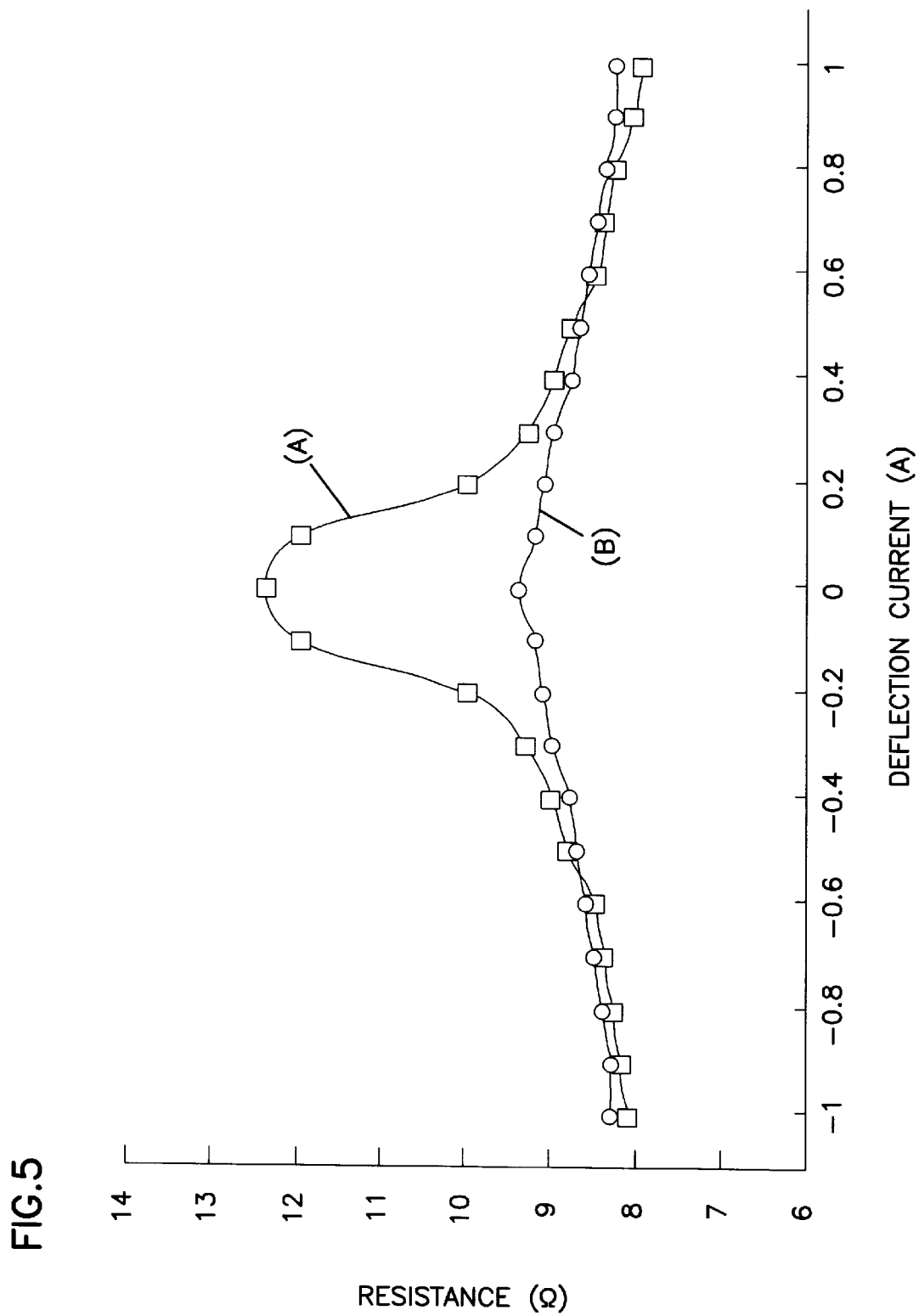
FIG. 5 is a diagram showing the impedance characteristics of the conventional vertical deflection circuit and the vertical deflection circuit of the present invention.

The range of the vertical deflection voltage 5 from −0.7 V to +0.7 V coincides with a central area within the range where the impedance of the vertical deflection yoke 3 changes abruptly near the center of the vertical deflection period due to the voltage-current characteristics of the diodes 203, 204, 206 and 207, as shown in the curve of FIG. 5a. In such a central area, the impedance of the vertical deflection yoke 3 shows the highest value in the conventional circuit as shown in FIG. 4. According to the invention, the impedance of the vertical linearity correction circuit 1 also increases because it becomes the resistance of the combined resistors 103 and 104. Thus, the combined impedance of the entire vertical deflection circuit decreases. As a result, flat impedance characteristics are attained. As FIG. 5 shows, the improved impedance characteristic curve (b) of the vertical deflection circuit of the present invention is flatter than the impedance characteristic curve (a) of a conventional vertical deflection circuit, which does not contain a vertical linearity correction circuit.

The range where the impedance of the vertical deflection yoke abruptly increases, depends on the forward voltage of the diodes used in the convergence correction circuit 2. Therefore the range varies in dependence on a kind of diodes to be used, or the range varies if a plurality of diodes connected in series is used. Such an abrupt impedance change in usual color picture tube takes place when the electron beam is irradiated to the vertical range within ±25% of a full screen height around the vertical center of the screen. The term "full screen" means a whole area where the electron beam is irradiated. Usually the area is larger than a displaying area. Further the above-mentioned range, ±25%, corresponds to a range of the vertical deflection current of ±0.5 A. However, the value varies in dependence on the maximum value of the vertical deflection voltage.

By selecting a kind or a number of the diodes 101 and 102, or by selecting appropriate resistances for the resistors 103 and 104, it is possible to optimize the impedance of the vertical deflection circuit at the vertical center of the color picture tube screen, and to effectively reduce the white horizontal belt-like area which appears in the vertical center portion of the color picture tube screen.

The following is an example of each resistor's resistance to optimally reduce the impedance of the vertical deflection circuit, which is adapted for a deflection yoke for a 41 cm (17 inch) color picture tube:

The vertical deflection coil 60 has an inductance of 6.36 mH and an impedance of 8.18 Ω, the resistor 103 has a resistance of 5.6 kΩ and the resistor 104 has a resistance of 270Ω.

It is preferable to use, as the diodes 101 and 102, diodes having substantially the same voltage-current characteristics as the diodes used for the convergence correction circuit 2. In that case, the diodes 101 and 102 will be switched on and off simultaneously with the impedance change of the vertical deflection yoke 3. Therefore, since the switching of the resistor 103 is temporally matched with the impedance change of the vertical deflection yoke 3, it is easy to flatten the impedance characteristics of the vertical deflection circuit.

Second Embodiment

Figure 3:
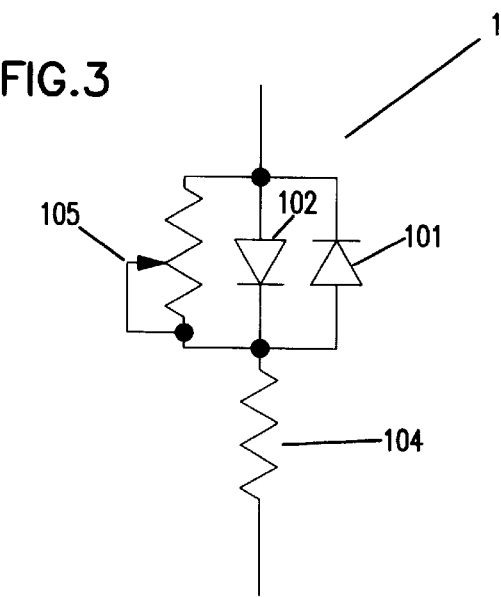
FIG. 3 is a circuit diagram showing a linearity correction circuit in a vertical deflection circuit according to the second embodiment of this invention.

FIG. 3 shows a vertical linearity correction circuit for a second embodiment of the present invention. The circuit in FIG. 3 is a modified example of the vertical linearity correction circuit 1 in FIG. 1. What is different from the first embodiment is that the resistor 103 of the vertical linearity correction circuit 1 has been replaced by a variable resistor 105. As the basic function of the vertical deflection circuit of this embodiment is the same as in the first embodiment, a detailed explanation is not necessary.

With this embodiment of the vertical deflection circuit, by adjusting the resistance of the variable resistor 105 while observing the color picture tube screen, the white horizontal belt-like area that appears at the vertical center of the color picture tube screen easily can be suppressed to a minimum.

If variations occur during the manufacturing of the vertical deflection circuit or the color picture tube, or in the resistors in the vertical linearity correction circuit, it is necessary to exchange the resistors in the case of the first embodiment, but it suffices to adjust the resistance of the variable resistor 105 in the second embodiment.

In the circuit in FIG. 3, the resistor 103 in the first embodiment has been replaced by the variable resistor 105, but it is also possible to replace the resistor 104 with a variable resistor, or to replace both resistors 103 and 104 with variable resistors.

The above-mentioned embodiments explained the case of a convergence correction circuit that is added to a vertical deflection circuit, but the same effect would be attained even when adding a correction circuit other than the circuit utilizing the diode switching characteristics as explained above.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

The above descriptions are related to the example in which the impedance of the vertical deflection yoke increases in the vicinity of the center of vertical deflection period, or in the range where the deflection current is in the vicinity of 0 A. The present invention is also effective in a case where the impedance of the vertical deflection yoke decreases in the range where the deflection current is in the vicinity of 0 A In that case, it is required to appropriately select the resistances for the resistors in the vertical linearity correction circuit 1 and connect them in parallel or series to the vertical deflection yoke 3.

What is claimed is:

1. A vertical deflection circuit for a color picture tube apparatus, comprising:

a vertical deflection yoke having a vertical deflection coil, a convergence correction circuit using a diode as a switch, and a vertical coma aberration correction coil; and a vertical linearity correction circuit connected to said vertical deflection yoke, an impedance of said vertical linearity correction circuit varying within a range where a vertical deflection current is in the vicinity of 0 A so as to reduce an impedance change of said vertical deflection circuit in that range.

2. The vertical deflection circuit according to claim 1, wherein said vertical linearity correction circuit is connected in parallel to said vertical deflection yoke and comprises a first diode;

a second diode connected in parallel to said first diode and disposed in a direction reverse to said first diode;

a first resistor connected in parallel to said first diode and said second diode; and a second resistor connected in series to said first diode and said second diode.

3. The vertical deflection circuit according to claim 2, wherein said first diode and said second diode have substantially the same voltage-current characteristics as the diode in said convergence correction circuit.

4. The vertical deflection circuit according to claim 2, wherein at least one of said first resistor and said second resistor is a variable resistor.

5. The vertical deflection circuit according to claim 1, wherein the range where a vertical deflection current is in the vicinity of 0 A, corresponds to a range within ±25% of a full screen height from the vertical center of the screen.

6. The vertical deflection circuit according to claim 1, wherein the range where a vertical deflection current is in the vicinity of 0 A, corresponds to a range within ±0.5 A of the vertical deflection current.

7. A color picture tube apparatus having a color picture tube with a built-in inline electron gun, including a vertical deflection circuit that comprises:

a vertical deflection yoke having a vertical deflection coil, a convergence correction circuit using a diode as a switch, and a vertical coma aberration correction coil, which is mounted on the color picture tube; and a vertical linearity correction circuit connected to said vertical deflection yoke, an impedance of said vertical linearity correction circuit varying within a range where a vertical deflection current is in the vicinity of 0 A so as to reduce an impedance of said vertical deflection circuit.

8. The color picture tube apparatus according to claim 7, wherein said vertical linearity correction circuit is connected in parallel to said vertical deflection yoke and comprises:

a first diode;

a second diode connected in parallel to said first diode and disposed in a direction reverse to said first diode;

a first resistor connected in parallel to said first diode and said second diode; and a second resistor connected in series to said first diode and said second diode.

* * * * *